United States Patent
Feinberg et al.

(10) Patent No.: US 6,208,721 B1
(45) Date of Patent: Mar. 27, 2001

(54) METHOD AND APPARATUS FOR IDENTIFYING TELEPHONE CALLERS WHO HAVE BEEN UNSUCCESSFUL IN REACHING A CALLED DESTINATION

(75) Inventors: Brion Noah Feinberg, Morganville; Carol H. Welch, Morristown, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/235,435

(22) Filed: Jan. 22, 1999

(51) Int. Cl.⁷ .................................................. H04M 15/00
(52) U.S. Cl. ........................ 379/134; 379/111; 379/113; 379/134
(58) Field of Search .................. 379/111–115, 120–121, 379/127, 133–134, 201, 207, 265–266, 309, 34, 37

(56) References Cited

U.S. PATENT DOCUMENTS

| | | | |
|---|---|---|---|
| 4,408,100 | * 10/1983 | Pritz et al. | 379/67 |
| 4,788,718 | * 11/1988 | McNabb et al. | 379/113 |
| 4,924,491 | * 5/1990 | Compton et al. | 379/37 |
| 5,509,055 | * 4/1996 | Ehrlich et al. | 379/133 |
| 5,859,903 | * 1/1999 | Lee | 379/157 |
| 5,999,604 | * 12/1999 | Walter | 379/133 |

OTHER PUBLICATIONS

Patent No. 5,311,574, filed on Oct. 23, 1991 and issued on May 10, 1994 to Konstantin Livanos. Class: 379/88.
Patent No. 5,530,741, filed on Nov. 23, 1993 and issued on Jun. 25, 1996 to Robert M. Rubin. Class: 379/142.

\* cited by examiner

*Primary Examiner*—Duc Nguyen
(74) *Attorney, Agent, or Firm*—F. Luludis; T. J. Bean

(57) ABSTRACT

A system identifies calling parties who are unable to successfully complete calls to a called party. Call attempt failure records are retrieved from a local exchange carrier that services the calling parties, from a local exchange carrier that services the called party, and from an interexchange carrier that carries calls between the two local exchanges. Call completion records are retrieved from the local exchange carrier serving the called party. The failure records are compared to the completion records to determine which calling parties experienced one or more failed call attempt to the called party, and of these calling parties, which parties also failed to complete subsequent call attempts to the called party. The system also reports the intensity of calls made by these parties to the called party over a specified time period.

15 Claims, 8 Drawing Sheets

FIG. 3
(PRIOR ART)
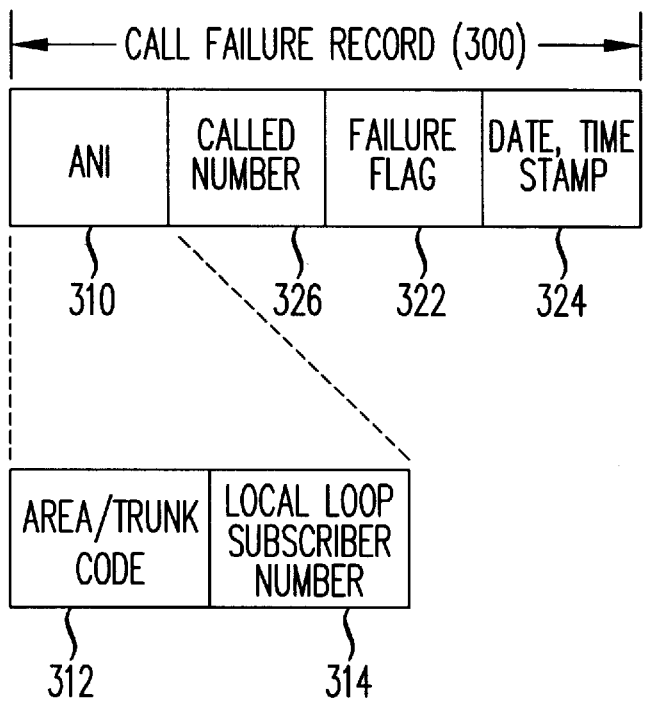
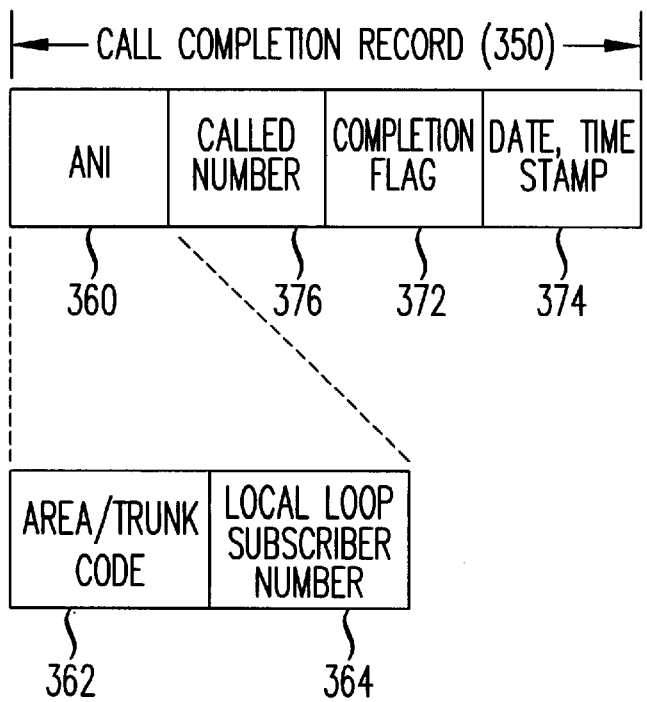

METHOD AND APPARATUS FOR IDENTIFYING TELEPHONE CALLERS WHO HAVE BEEN UNSUCCESSFUL IN REACHING A CALLED DESTINATION

FIELD OF THE INVENTION

This invention relates to the network management of telephone systems, and more particularly to the identification and characterization of calling parties who have had at least one failed call attempt to a specified called party destination over a particular interval of time.

BACKGROUND OF THE INVENTION

In a large-scale public communications network, a calling party may not always be successful in connecting to a desired called party destination. Connection failures can be attributed to many causes, including the unavailability of the called party and the possibility of network blockages and other call-affecting network failures at many points across the network. The impact of these failed calls can be significant.

For example, direct marketers, in particular, generate substantial revenues from buyers who call in response to advertisements placed in wide-reaching media such as TV and radio, the Internet, and newspapers. The direct marketers often provide 800 numbers in their advertisements to encourage buyer response by telephone. Broadly placed direct marketing advertisements can generate high levels of potential buyer demand across a wide geographic area. This demand can result in high associated 800 service call volumes, which can exceed network capacities, and thereby lead to heightened incidences of network blockage and call failure. The resulting failed calls can represent a significant loss in potential buyers and in potential revenues for the direct marketers.

Some information about the call attempts made by these otherwise lost buyers is currently available. For example, caller identification data can be captured by a local exchange carrier (LEC), and forwarded to other LECs and interexchange carriers (IXCs) in the calling chain (see, e.g., U.S. Pat. No.5,530,741, issued to Rubin on Jun. 25, 1996). And network management systems supporting individual network operators are capable of tracking call attempt failures in association with caller identification data (see, e.g., 5ESS Input/Output Messages, Manual No. 235-600-700/750, Issue 15.01C, Lucent Technologies Inc., Mar. 1998, describing an MDII message used, among other things, to report call attempt failure information to local and centralized network maintenance consoles where 5ESS switch performance is monitored). However, while some of the required information components exist, no single, integrated mechanism has heretofore been developed to collect failed call attempt information in a reliable, integrated fashion from the multiple exchange carriers that collectively provide, for example, 800 service to prospective buyers in a direct marketing environment.

SUMMARY OF THE INVENTION

Called party access to information about failed call attempts is significantly enhanced in an unsuccessful caller identification system that uses standard caller identification information as a basis for comparing call attempt data retrieved from a variety of sources. Specifically, call failure records routinely tracked by the IXCs and LECs (using systems such as Lucent Technologies' NETMINDER with network trouble patterning features) are compared with call completion data (tracked by sophisticated call center systems such as Lucent Technologies' DEFINITY Enterprise Communications Server—Automatic Call Distributor Platform).

In an exemplary embodiment of the invention, the unsuccessful caller identification system comprises a call attempt collector and a call attempt analyzer that are interconnected to telecommunications network facilities for one or more IXC's and LEC's. The system further comprises a method by which the call attempt collector and the call attempt analyzer, respectively, retrieve call attempt data via the network and examine the retrieved information to identify calling parties who were unsuccessful in reaching one or more specified called destinations. The system provides a way for users to specify its parameters of operation, and a way for users to retrieve and display the results of its analyses.

BRIEF DESCRIPTION OF THE DRAWING

A more complete understanding of the invention may be obtained by reading the following detailed description of a specific illustrative embodiment of the invention in conjunction with the appended drawing in which:

FIG. 3 provides a high-level description of the data records that are collected and analyzed by the present invention in its normal operation;

Figure 1:
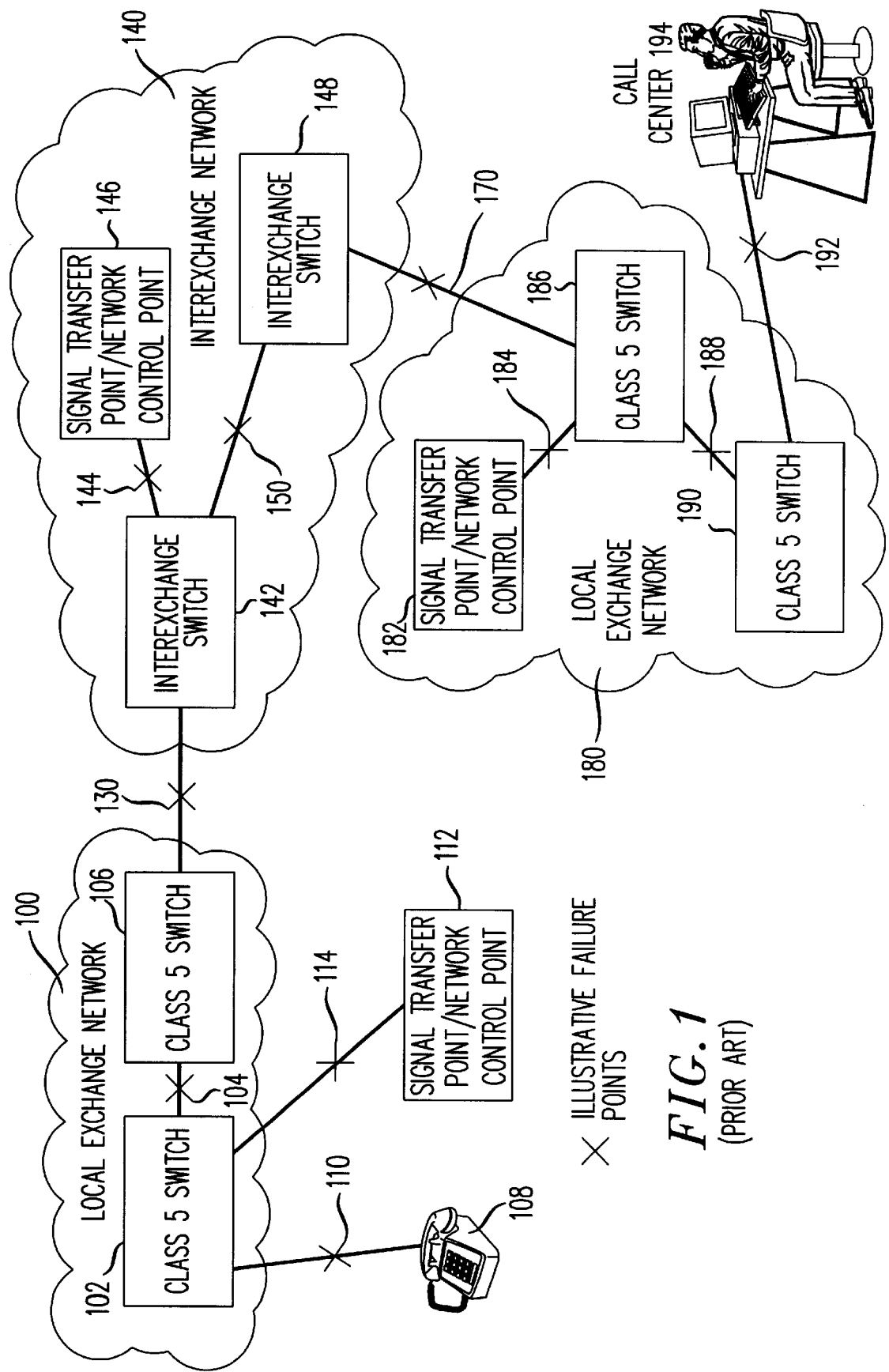
FIG. 1 illustrates a conventional telephone network providing 800 service, and indicates the possible call blockage points in a typical 800 call attempt.
Figure 2:
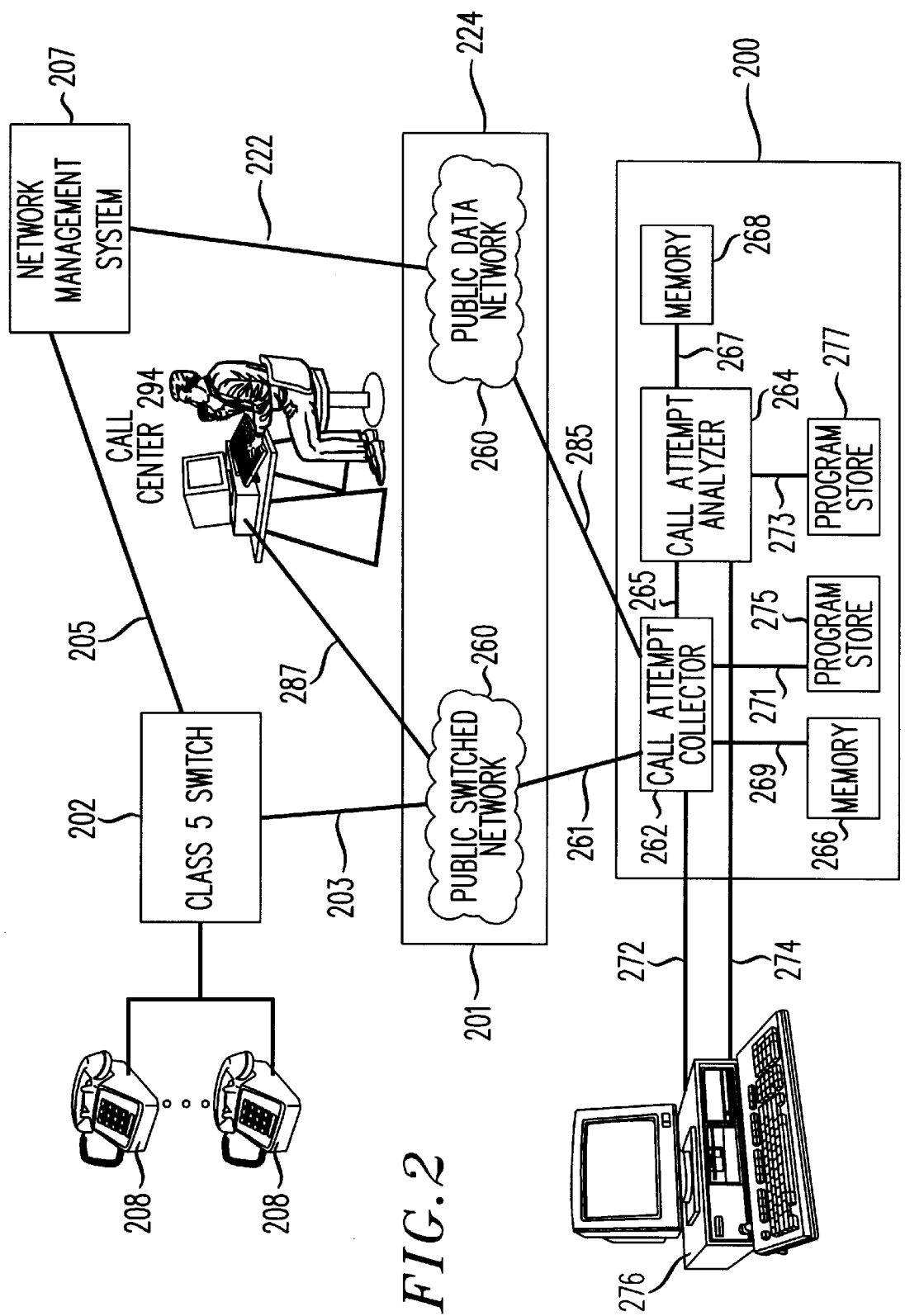
FIG. 2 depicts an illustrative embodiment of the present invention.

For consistency and ease of understanding, those elements of each figure that are similar or identical share reference numerals that are equivalent in the two least significant digit positions (for example, call center 194 of FIG. 1 is equivalent to call center 294 of FIG. 2).

DETAILED DESCRIPTION

By way of further background, in a typical 800 service telephone call made, for example, by a prospective purchaser to a direct marketer's call center, numerous opportunities exist for network blockage and call attempt failures. A simplified illustration depicting a conventional 800 service telephone network is shown in FIG. 1. In FIG. 1, the network comprises two local exchange networks 100, 180 (hereinafter referred to as LECN's) and an interexchange network 140 (hereinafter referred to as an IXCN). The LECN 100 includes two standard, so-called class 5 switches 102, 106 and a signal transfer point/network control point cluster 112 (hereinafter referred to as an NCP). Each cluster, incorporating its own network topology to interconnect network control point nodes to network switches via signal transfer point nodes, is shown in a simplified fashion for illustrative purposes as a singular node in the network. Similar to the LECN 100, the LECN 180 of FIG. 1 includes two class five switches 186, 190 and an NCP 182. The IXCN 140 contains two interexchange switches 142, 148 and an NCP 146.

The NCP's 112, 146 and 182 provide routing information that assists in establishing the network path required to complete an 800 service call. Thus, as illustrated by this example, when a subscriber 108 places an 800 service call, the subscriber's connecting class 5 switch 102 queries its associated NCP 112 to determine routing through the LECN 100. In this example, the switch 102 routes the call through the switch 106 to reach the IXCN 140.

At the IXCN 140, the interexchange switch 142 queries its NCP 146 to determine routing through IXCN 140. In this case, the switch 142 routes the call through the interexchange switch 148 to reach the LECN 180. At the LECN 180, the class 5 switch 186 queries its associated NCP 182 to determine that the call should be routed through the switch 190 to finally reach the called party at the call center 194.

As can be seen from this simplified example depicted in FIG. 1, a typical 800 service call is directed on a path through a number of switch nodes in several networks in order to reach its final destination. Blockages and other conditions leading to call attempt failures can occur at many points on this path. For example, a blockage 110 may prevent the subscriber 108 from reaching the switch 102. Blockages 104, 130, 150, 170, and 188 may occur along the switched path between the switch 102 serving the subscriber 108 and the switch 190 serving the call center 194. Blockages 114, 144, and 184 may occur between the switches 102, 142, and 186, and the NCP's 112, 146, and 182, respectively. And a blockage 192 may occur between the call center 194 and the switch 190. These examples are merely illustrative, and do not account for call attempt failures caused by many other possible failure conditions experienced at the switches and within the NCP clusters.

Because call attempt failures prevent calling parties from directly reaching called parties, these called parties will typically be unaware of call attempt failures. Even under circumstances in which a called party is supported by a call center with access to call failure data provided by a supporting LECN, the called party will remain unaware of call failures occurring outside of the boundaries of that LECN. Unaware, the called parties will be unable to actively remedy call failures occurring outside of these boundaries.

In accordance with the invention, called party access to information about failed call attempts is significantly enhanced by an unsuccessful caller identification system that uses standard caller identification information as a basis for comparing call attempt data retrieved from a variety of sources.

A specific illustrative embodiment of this system is depicted in FIG. 2. Unsuccessful caller identification system 200 comprises a call attempt collector 262 with an associated memory 266 and a program store 275. The system 200 further comprises a call attempt analyzer 264 with an associated memory 268 and a program store 277.

Information is provided to the system 200 via a series of communications networks 201 and associated links. For example, access by the system 200 to a public switched network 260 in network 201 is provided via a link 261. In addition, the system 200 has access to a public data network 224 in network 201 via a link 285.

User access to the system 200 is provided via a terminal 276 or another peripheral device. In the embodiment of FIG. 2, the terminal 276 is connected to the call attempt collector 262 and the call attempt analyzer 264 by the links 274, 272 respectively.

Key to its operation, the system 200 incorporates software that is stored in the program stores 275, 277. The programmed system may be implemented within a network management system maintained by an LEC or IXC, within a call center system, or as a stand-alone, general purpose computer system with stored program control and telephonic data communications capabilities.

An interested called party (hereinafter referred to as the called party user) controls actions taken by the system 200 of FIG. 2 to collect and analyze failed call attempt data. A called party user request for tracking call attempts is entered via the terminal 276 to the call attempt collector 262 and to the call attempt analyzer 264 via links 274, 272, respectively. Details of the request associated with data gathering are stored by the call attempt collector 262 in the memory 266, and details associated with the analysis of the data are stored by the call attempt analyzer 264 in the memory 268.

Over a time period specified in the called party user request, the system 200 of FIG. 2 accesses the public switched network 260 via the link 261 and the public data network 224 via the link 285 to retrieve and process the requested data. The data are retrieved from LEC and IXC facilities such as the LEC network management system 207 and call center facilities such as the call center 294.

More specifically, call attempt data for each called party are retrieved from user-specified data sources by the call attempt collector 262, and sent over the link 269 to be stored in the memory 266. The call attempt analyzer 264 retrieves this data via the call attempt collector 262 for analysis. After this data is analyzed, the results of the analysis are sent by the call attempt analyzer 264 over the link 267 to be stored in the memory 268. The called party user is able to view the results of the analysis at the terminal 276 by asking the call attempt analyzer 264 to retrieve these results from the memory 268.

The call attempt collector 262 gathers data provided in the formats illustrated in FIG. 3. Network management systems supporting LEC and IXC networks provide failed call attempt data in a standard call failure record (hereinafter referred to as a CFR) format 300 (see, e.g., International Telecommunication Union—Telecommunication Standardization Sector (ITU-T) Standard Q.825—Call Detail Recording, incorporated herein by reference). The CFR format 300 includes an area or trunk code field 312 and a local loop subscriber number field 314. These two elements together represent an automatic number identification field 310 (hereinafter referred to as an ANI field), which identifies the calling party. Additionally, the CFR format 300 includes a field 326 containing a representation of the called number, a failure flag field 322 and a date and time stamp field 324.

Call completion data are provided in a standard call completion record (hereinafter referred to as a CCR) format 350 of FIG. 3. These data are supplied by the same LEC and IXC network management systems that supply failed call attempt data, or by one or more call centers supporting the called party. Accordingly, the individual sources of data (hereinafter denoted as the data sources $S_h$) for failed call attempts may be somewhat different from the individual sources of data (hereinafter referred to as the data sources $C_i$) for completed calls (successful call attempts).

The manner in which call completion data can be provided by a call center is well established. For example, call completions may be logged by a Definity®) Enterprise Communications Server—ACD Platform, and retrieved using an ASAI protocol over a CTI port by a call center management system such as Nabnassett's Voice Enhanced Services Platform.

Similar to the CFR format 300, the CCR format 350 of FIG. 3 includes an ANI field 360 comprising an area or trunk code 362 and a local loop subscriber number 364. Further, the format 350 includes a field 376 containing a representation of the called number, a completion flag field 372 and a date and time stamp field 374.

Figure 4:
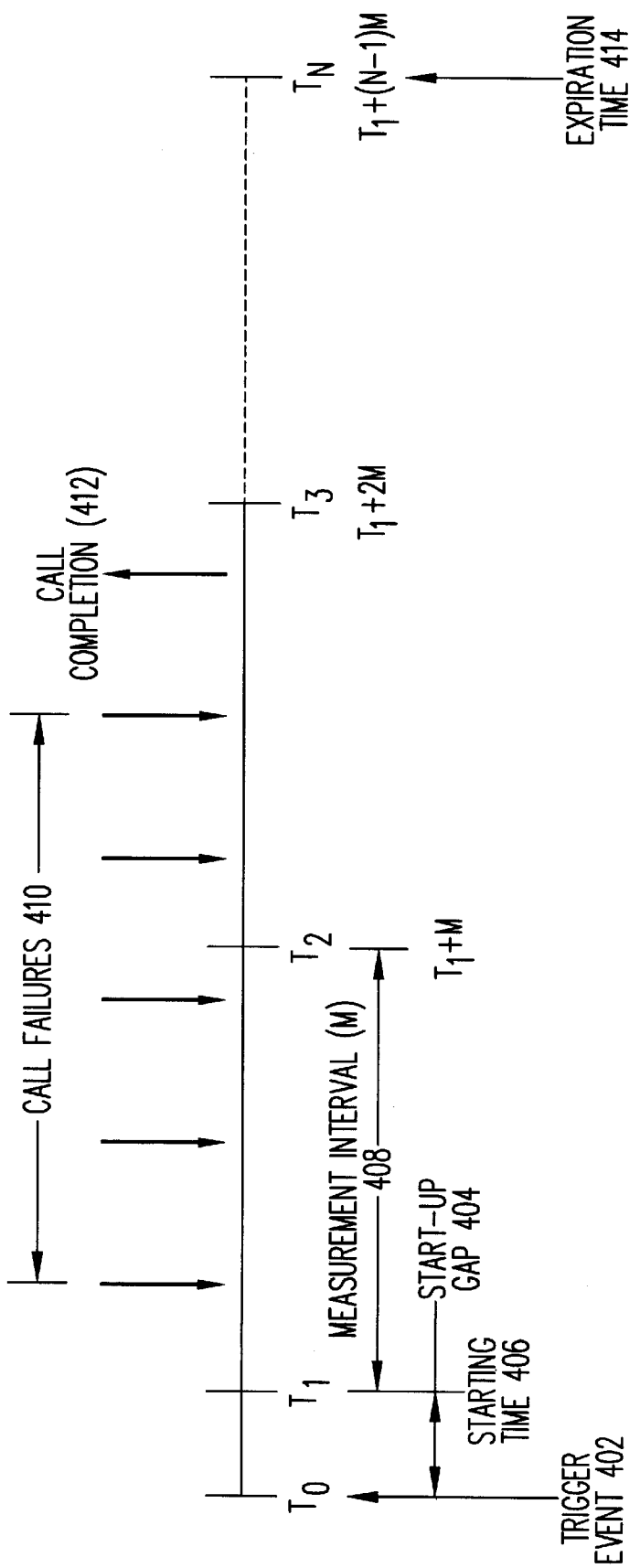
FIG. 4 shows a timeline for this data analysis.

The timing of collection activities by the call attempt collector 262 of FIG. 2 is illustrated in FIG. 4. Collection activities are typically initiated by a trigger event 402, which may be, for example, associated with a call-stimulating direct marketing event such as an Internet-announced sales offer. If the called party user anticipates a delay in caller response to this stimulus, data collection may be delayed as indicated by start-up gap 404 to begin at a starting time 406.

Call attempt data is collected from the starting time 406 through an expiration time 414. Expiration time 414 is defined as:

$$T_1 + (N-1)*M \qquad (1)$$

where:
T$_1$ is the starting time 406,
M is a user-defined measurement interval, and
N is a user-specified integer, such that
(N−1)*M defines the total measurement period Over the period delimited by the starting time 406 and the expiration time 414, data are collected by the call attempt collector 262 of FIG. 2. These collected data are illustrated as the call failures 410 and the call completions 412 shown in FIG. 4. The data are analyzed by the call attempt analyzer 264 of FIG. 2 to provide several types of information for the called party user.

First, data for each unique ANI are processed by the analyzer unit 264 to determine whether the associated calling party who experienced a failed call attempt either made no subsequent attempt or failed to reach the called party on a subsequent attempt. Such callers are hereinafter referred to as unsuccessful callers. Information about unsuccessful callers can be important, for example, in assisting direct marketers to identify calling parties who may be good targets for a variety of forms of follow-up contact, including , for example, a targeted directed mail promotion.

Secondly, data for each ANI are processed by the analyzer unit 264 to determine the number of times in a given time period that the associated calling party attempted to reach the called party destination (hereinafter referred to as the call attempt intensity). It is well-accepted within the direct marketing community that a significant relationship exists between call attempt intensity and propensity to purchase. Accordingly, the call attempt analyzer 264 can, for example, compute purchase propensity for each ANI as a function of call attempt intensity as follows:

$$\text{Propensity}_{ANI,M,i,CS=0} = \Sigma(\text{call failures}) \qquad (2)$$

and $$\text{Propensity}_{ANI,M,i,CS>0} = 0$$

for each interval i of length M in the measurement period spanning from $T_1$ through $T_1+(N-1)*M$,
where
CS represents the number of successful call attempts associated with the ANI during interval i.

Once the purchase propensities are calculated, the ANI's may be rank ordered by purchase propensity, and an index may be established, for example, relative to an average or otherwise normalized value Propensity$_{AVG}$:

$$\text{Propensity Index}_{ANI} = (\text{Propensity}_{ANI})/(\text{Propensity}_{AvG}) \qquad (3)$$

Because each ANI field 310 of FIG. 3 contains an area code 312, the call attempt analyzer 264 of FIG. 2 can also analyze purchase propensity data by area code to uncover geographic regions that exhibit high purchase propensities. Finally, because direct marketers can associate different promotional campaigns or media with distinct called party destinations (for example, by creating an Internet promotion with one 800 service response number and a radio promotion with another distinct 800 service response number), the effectiveness of each campaign and each medium can also be evaluated in terms of call volumes and purchase propensities.

The processes used to operate the unsuccessful caller identification system 200 of FIG. 2 are illustrated in FIGS. 5 through 8.

Figure 5:
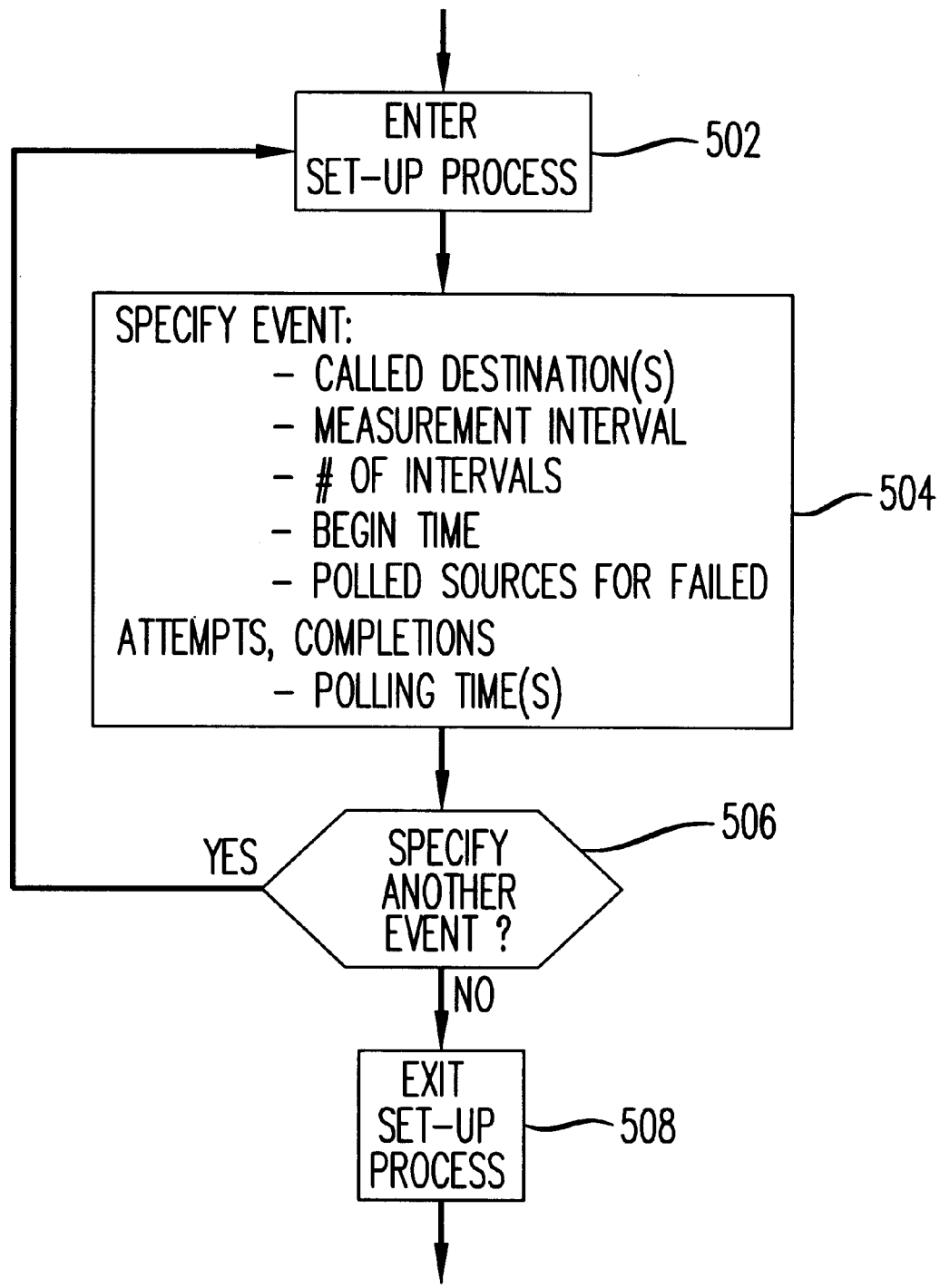
FIG. 5 diagrams the process by which data gathering and analysis are initiated.

In FIG. 5, a process is outlined that enables called party users to set up the system 200 for operation. Users enter the set-up process in step 502 of FIG. 5. This entry step is generally accomplished by issuing one or more commands to the system 200 from the terminal 276 of FIG. 2. After entering the process, the user is prompted in step 504 to supply a series of information that specifies what actions the system 200 will perform on the user's behalf. These actions are hereinafter referred to as the monitoring event. The information supplied by the user includes one or more called party destinations to be monitored, the measurement interval M, the number of intervals N−1 to be monitored, the data sources (for example, LEC and IXC network management systems, and call center systems) to be polled, and the times at which the data sources should be polled. The called party destinations may be supplied using a destination number identifier (DNI) field similar to the ANI field defined above and illustrated as field 326 in FIG. 3. The ability to monitor multiple DNIs will be particularly useful under circumstances in which a single called party employs multiple DNIs (for example, when the called party is served by an automatic call distribution system such as Lucent Technologies'DEFINITY Enterprise Communications Server—Automatic Call Distributor Platform).

After responding to these prompts, the user is asked in step 506 of FIG. 5 whether he or she wishes to specify another monitoring event. If the user responds affirmatively, he or she is brought back to the entry step 502. Otherwise, the user exits the process in step 508.

Figure 6:
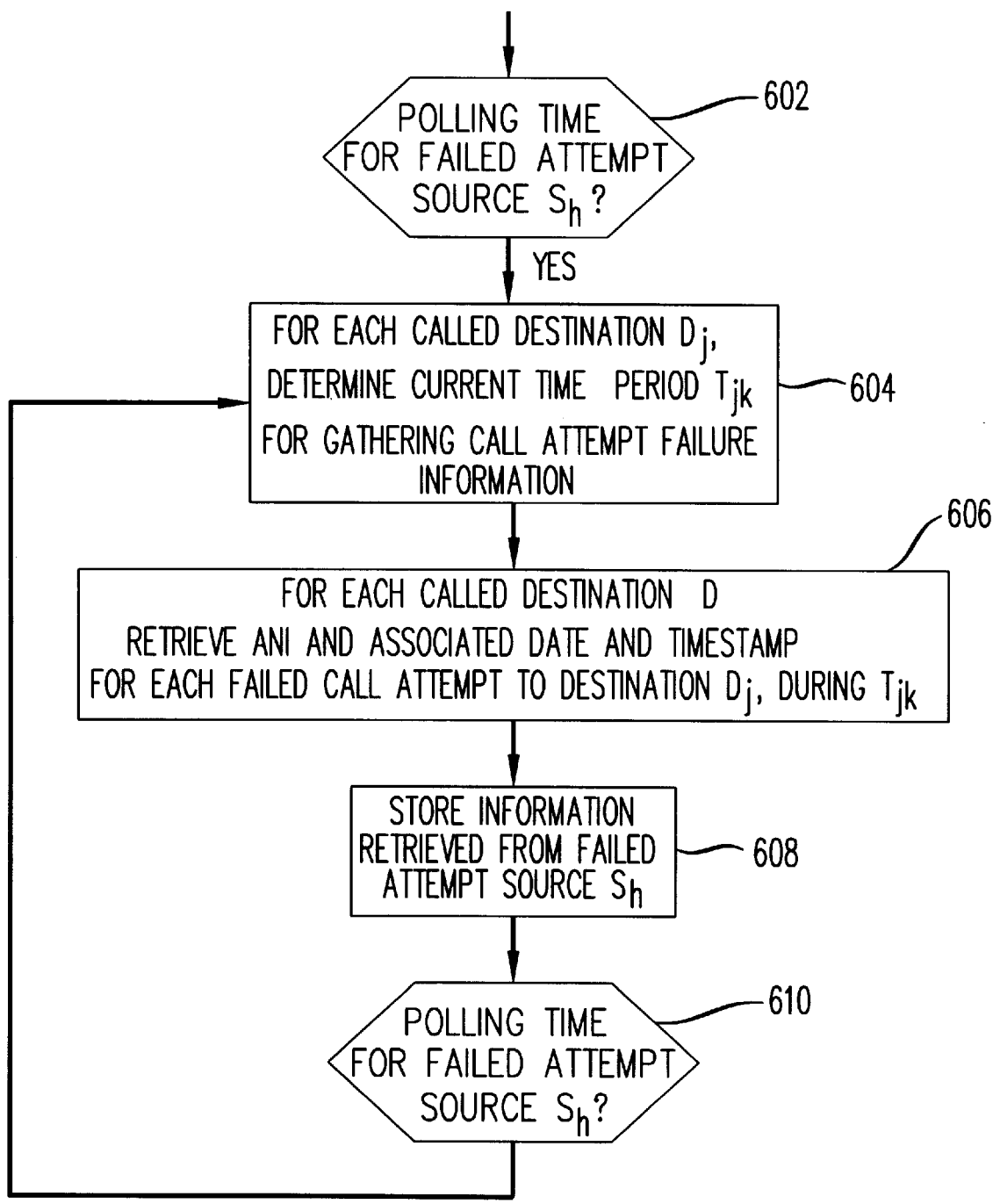
FIG. 6 diagrams the process by which failed call attempt data are gathered from each LEC and IXC source.
Figure 7:
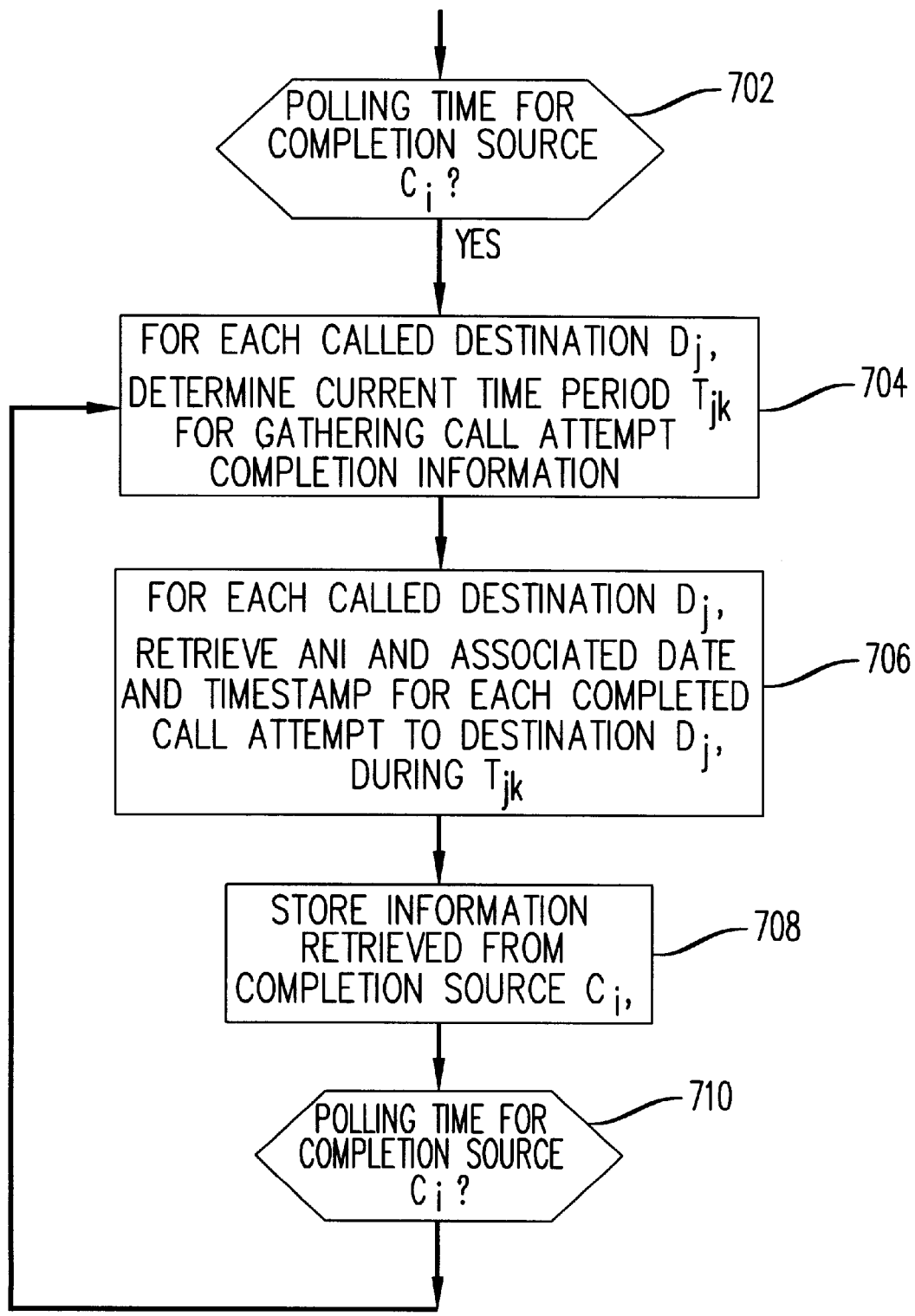
FIG. 7 diagrams the process by which call attempt completion data are gathered from each call center or other source.

Once the monitoring event has been specified, the call attempt data collection processes illustrated in FIGS. 6, 7 can begin. FIG. 6 illustrates the call attempt failure data acquisition process. In step 602, for each failed call attempt data source $S_h$, the call attempt collector 262 of FIG. 2 decides based on user set-up data whether a time has been reached for polling the data source. If such a time has been reached, the call attempt collector 262 of FIG. 2 determines in step 604 of FIG. 6 which of the called party destinations $D_j$ are expecting call attempt data for the current time period $T_{jk}$. For each such destination $D_j$, the call attempt collector 262 of FIG. 2 retrieves the ANI and a date and time stamp for each failed call attempt recorded by source $S_h$ during the current time period $T_{jk}$ (see step 606 of FIG. 6). In step 608, the call attempt collector 262 of FIG. 2 stores the retrieved information in the memory 266, and in step 610, the call attempt collector 262 waits for the next polling time for source $S_h$ to be reached.

A similar process for capturing successful call attempt data is illustrated in FIG. 7. In step 702, the call attempt collector 262 of FIG. 2 waits until a polling time has been reached for successful call attempt source $C_i$. In step 704 of FIG. 7, the collector 262 determines which of the destinations $D_j$ are expecting call attempt data for a current time period $T_{jk}$. In step 706, the call attempt collector 262 of FIG. 2 retrieves the ANI and a date and time stamp for each successful call attempt made during the current time period $T_{jk}$ to each destination $D_j$. In step 708 of FIG. 7, the call attempt collector 262 of FIG. 2 stores the information retrieved in step 706, and in step 710, waits for the next polling time for source $C_i$.

Figure 8:
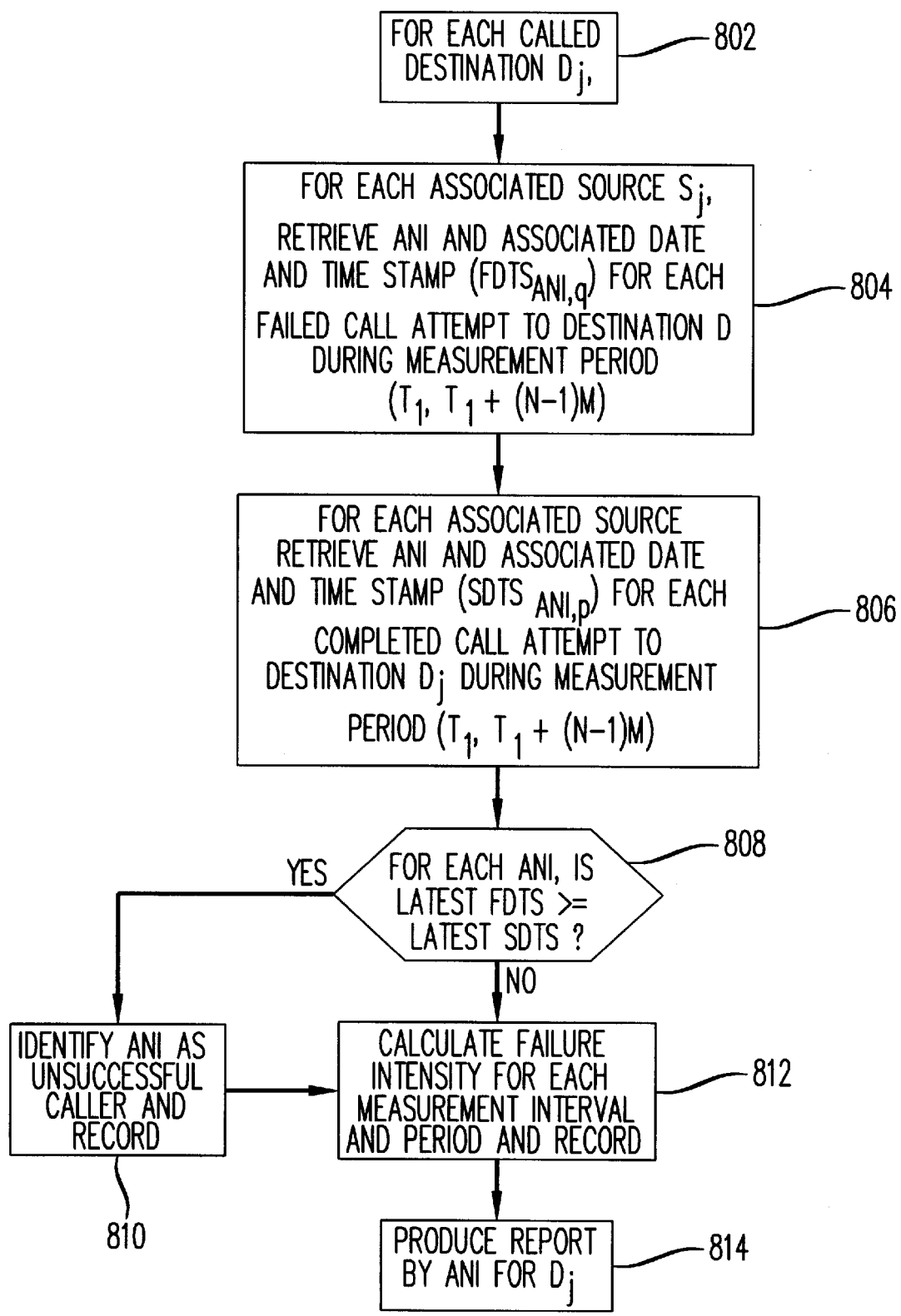
FIG. 8 illustrates the associated analysis and reporting process.

Once the necessary call attempt data have been collected, the call attempt analyzer 264 of FIG. 2 carries out the analysis and reporting process, as illustrated in FIG. 8. The process is undertaken for each called party destination $D_j$ as indicated in step 802. In step 804, the ANI for each calling party and an associated date and time stamp are retrieved for each failed call attempt record in which the date and time stamp for that record falls within the user-specified measurement period from $T_1$ to $T_1+(N-1)*M$. In step 806 of FIG. 8, the ANI for each calling party and associated date and time stamp are similarly retrieved from each completed call attempt record in which the date and time stamp fall within the measurement period.

In step 808 of FIG. 8, for each calling party, the call attempt analyzer 264 of FIG. 2 examines the latest date and time stamps for each call failure record and call completion record, to determine which date and time stamp is later in time. If the date and time stamp for the failed call attempt is later in time than the date and time stamp for the call completion, the call attempt analyzer 264 of FIG. 2 identifies the calling party as unsuccessful in step 810 of FIG. 8. In step 812, call attempt failure intensities are calculated for each calling party.

Finally, in step 814 of FIG. 8, a report is prepared and stored in the memory 268 of FIG. 2 for subsequent retrieval by the called party user for each called party destination $D_j$. For each called party destination $D_j$, for example, the report identifies each calling party (by ANI) that experienced at least one failed call attempt, indicates which calling parties were unsuccessful as determined in step 808 of FIG. 8, and provides one or more measures of call attempt intensity for each identified calling party over the measurement period.

The exemplary embodiment of this method described above is but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a worker skilled in the art without departing from the teachings of this invention. For example, the memories 266, 268 of FIG. 2 could be combined into a single memory element, and the determination of whether a calling party had been unsuccessful as diagrammed in FIG. 8 could be broadened to include calling parties whose call completions occurred at a time later than a specified time period following their first failed call attempts.

We claim:

1. A system for identifying one or more calling parties who were unsuccessful in reaching a called destination, the system comprising:

a collector for collecting information about call attempts and call completions by each calling party to the called destination, wherein said collector collects call attempt information from a first network management system responsive to a local exchange carrier terminating said calling parties, collects call attempt and call completion information from a second network management system responsive to a local exchange carrier terminating said called destination and collects call attempt information from a third network management system responsive to an interexchange carrier network interconnecting said local exchange carriers; and an analyzer for comparing the call attempt information with the call completion information to determine whether any of the one or more calling parties experienced at least one call attempt failure without also experiencing a subsequent call completion to the called destination.

2. The system of claim 1, wherein said collector further collects call completion data from a call center in the local exchange network terminating said called destination.

3. The system of claim 1, wherein the call attempt and call completion information includes an identifier for each calling party and a chronological stamp.

4. The system of claim 3, wherein said identifier is an automatic number identifier (ANI) and said chronological stamp is a time and date stamp.

5. The system of claim 1, wherein said analyzer further determines an intensity of call attempts by each calling party over a specified period of time.

6. The system of claim 1, said system further comprising a first storage device for storing information retrieved by said collector, and a second storage device for storing information produced by said analyzer.

7. The system of claim 6, said system further comprising a user interface for receiving user requests, transmitting user requests to said collector and said analyzer, selectively retrieving information produced and stored by said collector and said analyzer in response to the user requests, and displaying the retrieved information.

8. The system as defined in claim 1, wherein the called party has a plurality of associated destination number identifiers (DNIs) the collector collects call attempt and call completion information for each of the plurality of DNIs, and the analyzer identifies any calling party having at least one call attempt failure associated with any of the plurality of DNIs that was not matched by a subsequent call completion to one of the plurality of DNIs.

9. A method for identifying a calling party whose call attempt to a called destination is unsuccessful, wherein the calling party is terminated by an originating network interconnected to an interexchange network and the called destination is terminated by a destination network also interconnected to the interexchange network, the method comprising the steps of:

collecting call attempt data independently from a first network management system supporting the originating network, a second network management system supporting the interexchange network and a third network management system supporting the destination network;

collecting call completion data from the third network management system supporting the destination network;

storing the call attempt data and the call completion data; and comparing the call attempt data and the call completion data according to pre-determined criteria.

10. The method of claim 9, wherein said call attempt and call completion data includes an identifier for said calling party and a chronological stamp.

11. The method of claim 9, wherein said collector collects call completion data from a call center terminated in the local exchange network terminating said called destination.

12. The method of claim 9, wherein said pre-determined criteria specify identifying each calling party experiencing at least one call attempt failure without also experiencing a subsequent call completion to the called destination within a first pre-determined time period.

13. The method of claim 9, wherein said pre-determined criteria specify identifying an intensity of call attempts by the calling party over a second pre-determined time period.

14. The method of claim 9, wherein said pre-determined criteria are established by a party associated with the called destination.

15. The method of claim 9, wherein the called party has a plurality of associated destination number identifiers (DNIs) the collector collects call attempt and call completion information for each of the plurality of DNIs, and the analyzer identifies any calling party having at least one call attempt failure associated with any of the plurality of DNIs that was not matched by a subsequent call completion to one of the plurality of DNIs.

* * * * *